United States Patent
Hendriks

(10) Patent No.: US 8,210,071 B2
(45) Date of Patent: Jul. 3, 2012

(54) FLUID DRIVE SYSTEM

(75) Inventor: Jack Hendriks, Millet (CA)

(73) Assignee: Supreme International Limited, Wetaskiwin, Alberta (CA)

(*) Notice: Subject to any disclaimer, the term of this patent is extended or adjusted under 35 U.S.C. 154(b) by 1023 days.

(21) Appl. No.: 11/977,957

(22) Filed: Oct. 26, 2007

(65) Prior Publication Data

US 2008/0128193 A1     Jun. 5, 2008

Related U.S. Application Data

(60) Provisional application No. 60/870,340, filed on Dec. 15, 2006.

(30) Foreign Application Priority Data

Nov. 30, 2006  (CA) .................................... 2569441

(51) Int. Cl.
    *F16H 47/00* (2006.01)
(52) U.S. Cl. ...................................... 74/730.1; 366/603
(58) Field of Classification Search ................. 366/603; 74/720, 730.1
    See application file for complete search history.

(56) References Cited

U.S. PATENT DOCUMENTS

| | | | | |
|---|---|---|---|---|
| 2,213,349 A * | 9/1940 | Seibold | ........................... | 74/655 |
| 3,110,197 A * | 11/1963 | Prakash | ........................... | 74/718 |
| 3,338,115 A * | 8/1967 | Ritzema | ........................... | 475/35 |
| 4,887,984 A | 12/1989 | Newman | | |
| 5,090,528 A | 2/1992 | Massel | | |
| 5,129,285 A * | 7/1992 | Sugano et al. | ................ | 74/730.1 |
| 5,462,354 A * | 10/1995 | Neier | ............................ | 366/314 |
| 6,464,054 B2 * | 10/2002 | Fukunaga et al. | ........... | 192/3.29 |
| 6,758,426 B2 * | 7/2004 | Have | ................................ | 241/30 |
| 6,886,337 B2 * | 5/2005 | Friedrich et al. | ................. | 60/614 |
| 6,941,838 B2 * | 9/2005 | Hori et al. | ..................... | 74/730.1 |
| 7,341,372 B2 * | 3/2008 | Van Der Plas | ................ | 366/141 |
| 7,647,851 B2 * | 1/2010 | Adleff | ............................ | 74/720 |
| 7,694,519 B2 * | 4/2010 | Kley et al. | ....................... | 60/624 |
| 7,707,910 B2 * | 5/2010 | Klement | ...................... | 74/730.1 |
| 2005/0099885 A1 | 5/2005 | Tamminga | | |
| 2008/0216477 A1 * | 9/2008 | Kley et al. | ....................... | 60/624 |

OTHER PUBLICATIONS

Canadian Intellectual Property Office, Canadian Office Action Canadian Patent Application No. 2,569,441, Nov. 13, 2009, 2 pages.

* cited by examiner

*Primary Examiner* — Dirk Wright

(74) *Attorney, Agent, or Firm* — J. Jay Haugen; Parlee McLaws LLP

(57) ABSTRACT

A fluid drive system for vertical mixer tubs is provided. Rotational power from the power take-off of a tractor or other suitable vehicle is increased in rotational speed by an input gearbox. The input gearbox is, in turn, coupled to a fluid coupler that locks up when the input rotational speed reaches an optimum speed. The output of the fluid coupler is coupled to an output gearbox that reduces the rotational speed of the fluid coupler. The output of the output gearbox is connected to the drive mechanism of the mixer tub auger.

18 Claims, 2 Drawing Sheets

FLUID DRIVE SYSTEM

RELATED APPLICATIONS

The present application claims priority of U.S. Provisional Application Ser. No. 60/870,340 filed Dec. 15, 2006 and hereby incorporates the same Provisional Application by reference. The present application also claims priority of Canadian Patent Application Serial No. 2,569,441 filed Nov. 30, 2006 and hereby incorporates the same Canadian Patent Application by reference.

FIELD OF THE INVENTION

The present invention is related to the field of fluid drive systems, in particular, fluid drive systems used to transfer power from a tractor power take-off ("PTO") to a vertical mixing tub for mixing feedstuffs for livestock.

BACKGROUND

Vertical feed mixers have been used in agriculture for many years. Vertical mixers process forages and commodities of all types of feed for livestock. Vertical mixers include a tub containing one or more vertical augers. These augers can have knives mounted on their flights such that when the augers rotate, the knives will cut the forage and the augers will process and blend the components within the tub. The augers are typically driven using power from the PTO of a tractor or other type of motor vehicle having a suitable PTO system. Known designs of vertical mixers use automatic transmissions or 2- or 3-speed manual gearboxes in the driveline between the PTO and the augers in the vertical mixer.

The use of such transmissions or gearboxes is prone to failures due to the high start-up torque required to engage large mixers. In order to reduce the cost of the mixer, gearboxes are used that are not rated for the amount of horsepower and duty cycles that large mixers require. The operator of the mixer is required to shift gears on the gearbox while on the tractor seat using a shift cable. To do so requires that the PTO be disengaged and all driveline movement stopped so that gears can be shifted. On larger mixers, this process often adds too much time to feeding schedules for most operators. Operator misuse of the system often leads to component failures. The use of automatic transmissions solves the manual gearbox shifting problems but most suffer from mounting, cooling and reliability issues. Repairs to automatic transmissions are expensive.

SUMMARY

A fluid drive system is provided for a vertical mixer tub having one or more augers. In one embodiment, the system comprises an input gearbox for increasing the rotational speed of an input shaft driven by a PTO mounted on a vehicle such as a tractor or truck. In another embodiment, the gear ratio of the input gearbox can be 1:2 to provide an output rotational speed double that of the input shaft. A coupling shaft is used to connect the output of the input gearbox to a soft start fluid coupler or torque converter. In one embodiment, a flex coupling can be mounted between the coupling shaft and the input of the fluid coupler to reduce the shock and stress on the driveline system due to the high torque requirements on starting a mixer tub loaded with feed. A coupling shaft connects the output of the fluid coupler to an output gearbox that reduces the rotational speed of the coupling shaft. In one embodiment, the gear ratio of the output gearbox can be 2:1 to provide an output rotational speed half of the fluid coupler output. The output of the output gearbox is then connected to a drive shaft that is coupled to a drive mechanism of the auger in the vertical mixing tub, as well known to those skilled in the art.

In operation, the rotational speed of the PTO-driven input shaft can typically reach up to 1000 revolutions per minute ("RPM"). The input gearbox increases this input speed up to 2000 RPM whereby the fluid coupler can easily "lock-up" once the PTO speeds up to its nominal 1000 RPM speed. The output gearbox reduces the output speed of the fluid coupler back to 1000 RPM, which is a speed that is better suited for driving the auger in the vertical mixer tub.

DETAILED DESCRIPTION

Figure 1:
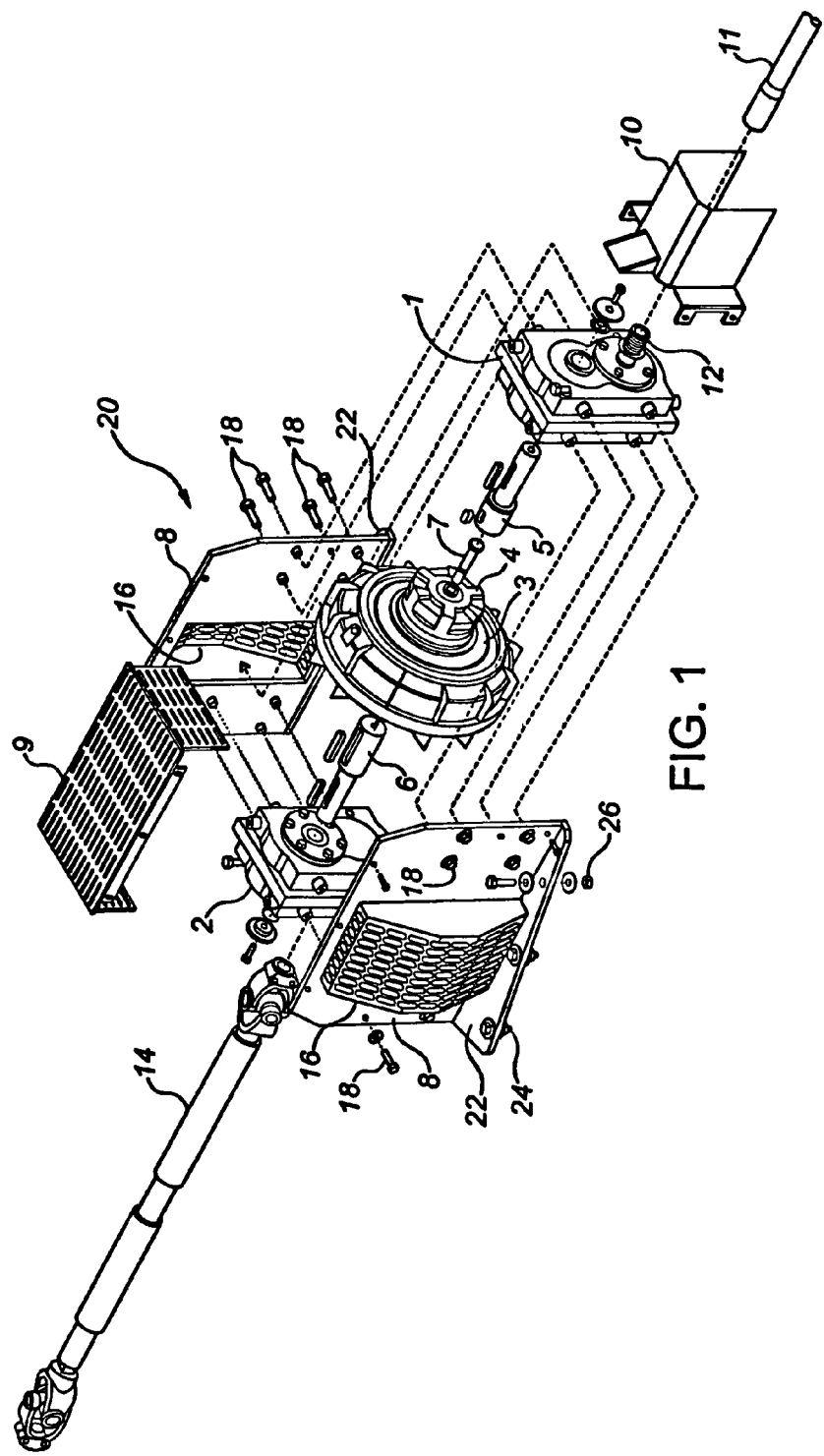
FIG. 1 is a perspective exploded view depicting a fluid drive system.
Figure 2:
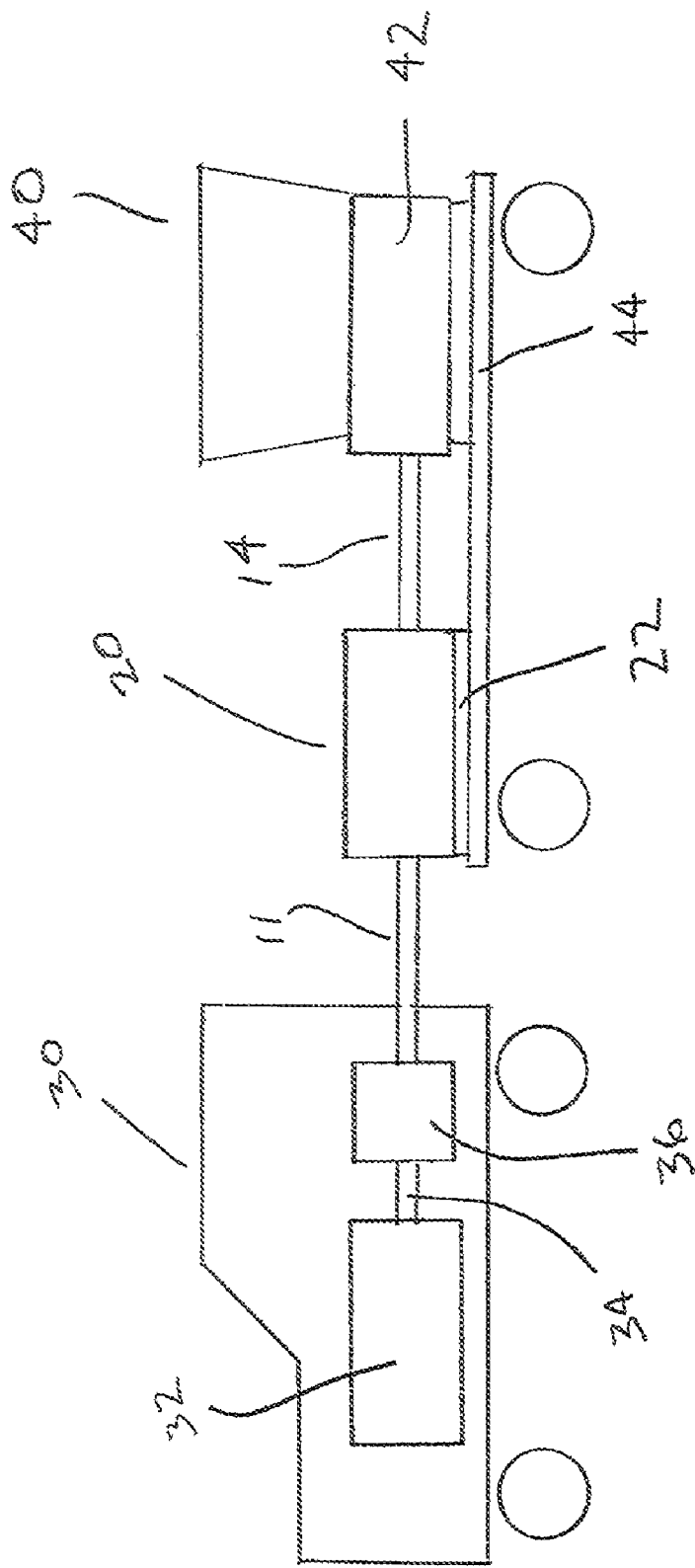
FIG. 2 is a block diagram depicting the fluid drive system of FIG. 1 disposed between a PTO unit disposed on a vehicle and a vertical feed mixer.

A fluid drive system for a vertical mixer tub is provided. Referring to FIGS. 1 and 2, an embodiment of the system is illustrated.

Fluid drive system 20 includes input drive shaft 11 coupled to spline shaft 12 of input gearbox 1. Input drive shaft 11 is driven by a PTO unit 36 that can be powered by a motor vehicle 30 such as a tractor, a truck or any other suitable vehicle or machinery, wherein engine 32 disposed in motor vehicle 30 can operate PTO unit 36 via coupling means 34, as well known to those skilled in the art. Gearbox 1 is a gear increasing transmission. In a representative embodiment, gearbox 1 has a gear ratio of 1:2 to provide an output rotational speed twice that of the input rotational speed.

Coupling shaft 5 connects the output of gearbox 1 to the input of fluid coupler 3. In another embodiment, a flex coupler 4 can be placed between the input of fluid coupler 3 and coupling shaft 5 to absorb driveline vibrations or stress when fluid drive system 20 is in operation. In a representative embodiment, fluid coupler 3 can be a hydrokinetic transmission or torque converter as well known to those skilled in the art.

The output of fluid coupler 3 is connected to the input of gearbox 2 via coupling shaft 6. In one embodiment, gearbox 2 is a gear reducing transmission. In a representative embodiment, gearbox 2 has a 2:1 gear ratio to provide an output rotational speed one-half of the input rotational speed. The output of gearbox 2 is connected to drive shaft 14 that, in turn, is connected to a drive mechanism 42 of an auger in a vertical mixing tub 40 as well known to those skilled in the art.

In one embodiment, gearboxes 1 and 2 are attached to and supported by side mounting plates 8 with bolts 18. Fluid coupler 3 is positioned in and supported by side mounting plates 8 in recesses 16. Side mounting plates 8 can be mounted on any suitable mounting surface that is in proximity to drive shaft 11 and PTO unit 36 as well as the vertical mixing tub 40. In this configuration, side mounting plates 8 provide structural support for gearboxes 1 and 2 and fluid coupler 3.

In another embodiment, cover shield 9 is attached to side mounting plates 8 to provide a protective shield over gearboxes 1 and 2 and fluid coupler 3. In a representative embodiment, fluid drive system 20 can be mounted on the frame or structure that supports the vertical mixing tub 40 it operates. For example, mounting flanges 22 can be fastened to a frame 44 or mounting platform disposed on the vertical mixing tub 40 or on a frame or mounting disposed on vehicle 30 by using bolts 24 and nuts 26. In a further embodiment, shield cover 10 is attached to side mounting plates 8 to provide a protective shield over drive shaft 11 where it couples with gearbox 1.

In operation, an operator throttles up the vehicle 30 that powers the PTO unit 36 in order to begin rotating drive shaft 11. In a representative embodiment, the PTO unit 36 will turn drive shaft 11 up to approximately 1000 RPM. As drive shaft 11 begins to turn and speed up its rotational speed at the input of gearbox 1, gearbox 1 turns coupling shaft 5 at a rotational speed faster than drive shaft 11. In the illustrated embodiment, gearbox 1 causes coupling shaft 5 to turn at twice the speed of drive shaft 11. Coupling shaft 5 turns the input of fluid coupler at a speed greater than 1000 RPM so that fluid coupler 3 can work near its peak efficiency. During start-up of the PTO unit 36, there is slippage initially within fluid coupler 3 that allows fluid coupler 3 to absorb vibrations in the driveline of the system during the start-up procedure.

As the PTO unit 36 throttles up to its nominal operational speed of 1000 RPM, coupling shaft 5 will turn at approximately 2000 RPM, which is a sufficient input rotational speed to fluid coupler 3 to "lock it up" and turn coupling shaft 6 at approximately 2000 RPM as well. Gearbox 2 reduces the input rotational speed of coupling shaft 6 to approximately 1000 RPM at the output of gearbox 2. Drive shaft 14, being coupled to the output of gearbox 2, will also turn at approximately 1000 RPM which is a suitable rotational speed to drive an auger in the vertical mixing tub 40 as well known to those skilled in the art.

A fluid drive system can accordingly be provided in a driveline between a PTO unit 36 and a vertical mixing tub 40 and, while simple and reliable, can handle the large start-up torque requirements when the mixer is loaded with foodstuffs to be mixed and/or cut.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

What is claimed is:

1. A fluid drive system for coupling an input drive shaft receiving rotational power from a power take-off ("PTO") unit, the PTO unit operatively coupled to an engine disposed in a motor vehicle, to an output drive shaft for operating a vertical feed mixing tub, the fluid drive system comprising:
    a) an input gearbox having an input and an output, the input capable of operatively coupling to the input drive shaft, the input gearbox configured whereby the output rotates faster than the input, the input drive shaft configured for operatively coupling to the PTO unit;
    b) a fluid coupler having an input and an output, the coupler input operatively coupled to the output of the input gearbox;
    c) a flex coupler disposed between the output of the input gearbox and the input of the fluid coupler; and
    d) an output gearbox having an input and an output, the input operatively coupled to the fluid coupler output, the output gearbox configured whereby the output rotates slower than the input, the output of the output gearbox capable of operatively coupling to the output drive shaft, the output drive shaft configured for operatively coupling to the vertical feed mixing tub.

2. The fluid drive system as set forth in claim 1 wherein the output drive shaft rotates at approximately the same rotational speed as the input drive shaft when the fluid drive system is coupled to the input and output drive shafts.

3. The fluid drive system as set forth in claim 1 wherein the input gearbox has a gear ratio of 1:2.

4. The fluid drive system as set forth in claim 1 wherein the output gearbox has a gear ratio of 2:1.

5. A method of coupling an input drive shaft receiving rotational power from a power take-off ("PTO") unit, the PTO unit operatively coupled to an engine disposed in a motor vehicle, to an output drive shaft for operating a vertical feed mixing tub, the method comprising the steps of:
    a) rotatably coupling the input drive shaft to a first coupling shaft whereby the first coupling shaft rotates faster than the rotational speed of the input drive shaft, the input drive shaft configured for operatively coupling to the PTO unit;
    b) rotatably coupling the first coupling shaft to a second coupling shaft whereby there is slippage initially between the first and second coupling shafts when the first coupling shaft begins to rotate, wherein the first coupling shaft is rotatably coupled to the second coupling shaft via a fluid coupler, and wherein the first coupling shaft is coupled to the fluid coupler via a flex coupler; and
    c) rotatably coupling the second coupling shaft to the output drive shaft whereby the output drive rotates slower than the rotational speed of the second coupling shaft, the output drive shaft configured for operatively coupling to the vertical feed mixing tub.

6. The method as set forth in claim 5 wherein the output drive shaft rotates at approximately the same rotational speed as the input drive shaft.

7. The method as set forth in claim 5 wherein the first coupling shaft rotates at twice the rotational speed of the input drive shaft.

8. The method as set forth in claim 5 wherein the output drive shaft rotates at half the rotational speed of the second coupling shaft.

9. A motor vehicle having a power take-off ("PTO") unit, the improvement comprising a fluid drive system for coupling the PTO unit to a vertical feed mixing tub, the fluid drive system comprising:
    a) an input drive shaft operatively coupling the PTO unit to an input gearbox having an input and an output, the input capable of operatively coupling to the input drive shaft, the input gearbox configured whereby the output rotates faster than the input;
    b) a fluid coupler having an input and an output, the coupler input operatively coupled to the output of the input gearbox;
    c) a flex coupler disposed between the output of the input gearbox and the input of the fluid coupler; and
    d) an output gearbox having an input and an output, the input operatively coupled to the fluid coupler output, the output gearbox configured whereby the output rotates slower than the input, the output of the output gearbox capable of operatively coupling to an output drive shaft operatively coupled to the vertical feed mixing tub.

10. The motor vehicle as set forth in claim 9 wherein the output drive shaft rotates at approximately the same rotational speed as the input drive shaft when the fluid drive system is coupled to the input and output drive shafts.

11. The motor vehicle as set forth in claim 9 wherein the input gearbox has a gear ratio of 1:2.

12. The motor vehicle as set forth in claim 9 wherein the output gearbox has a gear ratio of 2:1.

13. A drive system for coupling a power take-off ("PTO") unit disposed on a motor vehicle to a vertical feed mixing tub, the drive system comprising:
  a) first means for coupling an input drive shaft to a first coupling shaft whereby the first coupling shaft rotates faster than the rotational speed of the input drive shaft, the input drive shaft configured for receiving rotational power from the PTO unit;
  b) second means for coupling the first coupling shaft to a second coupling shaft whereby there is slippage initially between the first and second coupling shafts when the first coupling shaft begins to rotate;
  c) flex coupling means for coupling the first coupling shaft to the second means; and
  d) third means for coupling the second coupling shaft to an output drive shaft whereby the output drive shaft rotates slower than the rotational speed of the second coupling shaft, the output drive shaft configured for operatively coupling to the vertical feed mixing tub.

14. The drive system as set forth in claim 13 wherein the output drive shaft rotates at approximately the same rotational speed as the input drive shaft.

15. The drive system as set forth in claim 13 wherein the first coupling shaft rotates at twice the rotational speed of the input drive shaft.

16. The drive system as set forth in claim 13 wherein the output drive shaft rotates at half the rotational speed of the second coupling shaft.

17. The drive system as set forth in claim 13 wherein the second means further comprises a fluid coupler.

18. The drive system as set forth in claim 13 wherein the flex means further comprises a flex coupler.

* * * * *